United States Patent
Sargent et al.

[11] Patent Number: 5,988,941
[45] Date of Patent: Nov. 23, 1999

[54] BOAT LIFT CABLE LOCK APPARATUS

[75] Inventors: Charles L. Sargent, Bonita Springs; Daniel S. Carter, Fort Myers, both of Fla.

[73] Assignee: Quality Boat Lifts, Inc., Fort Myers, Fla.

[21] Appl. No.: 08/949,886

[22] Filed: Oct. 14, 1997

[51] Int. Cl.$^6$ ...................................................... B63C 3/06
[52] U.S. Cl. .................................. 405/3; 114/48; 187/372
[58] Field of Search ............................... 405/1, 3; 114/44, 114/48; 187/213, 214, 372; 24/115 M, 136 R

[56]         References Cited

U.S. PATENT DOCUMENTS

| | | | |
|---|---|---|---|
| 3,516,304 | 6/1970 | Vermette | 187/372 X |
| 3,905,711 | 9/1975 | Rogers | 24/115 M X |
| 4,384,389 | 5/1983 | Sato | 24/115 M X |
| 4,809,408 | 3/1989 | Abrahamson | 24/115 M X |
| 5,553,360 | 9/1996 | Lucas et al. | 24/136 R X |
| 5,628,583 | 5/1997 | Gibson | 405/3 |

*Primary Examiner*—David Bagnell
*Assistant Examiner*—Tara L. Mayo
*Attorney, Agent, or Firm*—William E. Noonan

[57] ABSTRACT

A boat lift locking apparatus is disclosed for releasably fastening a cable to a structural component of a boat lift. The apparatus includes a bracket secured to the structural component and having a channel, which has a relatively wide portion and a relatively narrow portion. A locking element is slidably mounted in the channel. The cable extends through the channel between the locking element and the bracket. The locking element is urged selectively toward the narrow portion of the channel to frictionally lock the cable between the locking element and the bracket and toward the wide portion of the channel to unlock the cable and permit the cable to slide longitudinally through the channel between the locking element and the bracket.

19 Claims, 7 Drawing Sheets

BOAT LIFT CABLE LOCK APPARATUS

FIELD OF THE INVENTION

This invention relates to a boat lift cable lock apparatus and, more particularly, to an apparatus for releasably and adjustably securing a boat lift cable to a structural component, such as a cable beam or cradle beam.

BACKGROUND OF THE INVENTION

Conventional salt water boat lift mechanisms typically employ one or more winch driven cables to raise and lower a boat-supporting platform. In a single or three-stage lift, the distal or terminal end of each cable is normally fastened to one of the cradle beams of the platform. Two-stage boat lifts connect the cables to the platform by pulleys which are themselves mounted to the cradle beams. Each cable in the two stage lift is fastened at its terminal end to a cable beam, which accommodates a winch or winder. In either case, the cable is fastened to a respective beam at essentially a single point of attachment.

Currently, when a boat lift is constructed, the terminal end of each cable must be attached at the factory. This operation is required to ensure that the terminal connection is absolutely secure. On site attachment by often unsophisticated or poorly trained installers is simply too unreliable. Therefore, the lift manufacturer itself secures the terminal end of each cable to its desired attachment point, typically by means of a connecting loop, which is formed at the terminal end of the cable.

It is very difficult, if not impossible, to string the above described cable loop through the pulleys of a multiple stage boat lift. Accordingly, most boat lift cables are strung and installed in a rearward direction. After being fastened at its terminal point, the cable is strung through the various pulleys. Finally, the proximal end of the cable is attached to the cable winder. This operation is normally performed on site. Fastening security is less critical at the proximal end of the cable. As the winder is operated and the cable is wrapped thereon, the winder circumferentially absorbs and distributes the lifting load. Little or no load is experienced at the proximal end of the cable.

Stringing the cable rearwardly from the terminal point of attachment to the winder presents several problems for the boat lift installer. This technique forces the installer to "field wind" the cables onto the winder during the installation process. Engaging the cable with the winder on site or in the field is awkward, as the installer must typically work over water at inconvenient heights. It would be far preferable to prewind the cables onto the winder at the factory, where this procedure could be performed faster, more conveniently and at far less expense. However, to date, this operation has not been widely used because of the reluctance to secure the terminal end of the cable in the field.

Securing the terminal end of the cable to its respective point of attachment and stringing the cable rearwardly to the winder also complicates cable adjustment. Following installation, it is often necessary to adjust the cable lengths to compensate for settling of the cable beam support pilings. Such settling normally occurs when a boat is first elevated by the lift. When the terminal end of the cable is permanently fixed at the factory, it is extremely difficult to make the necessary length adjustments. The cable must be detached from the winder and totally restrung. This is an extremely time consuming, awkward and inconvenient procedure.

Replacement of worn cables is another commonplace problem. Once again, the new cable must first be attached at its proximal end and then strung in a rearward direction to the winder. When a new cable is installed, its length almost always requires adjustment due to previous settling of the support pilings. The new cable must be detached and restrung to adjust that length.

Accordingly, the currently accepted practice of permanently attaching the terminal end of the boat lift cable to its respective point of attachment and stringing the cable rearwardly toward the winder complicates boat lift installation considerably and adds to the difficulty, time and expense of such installation. The need exists for a means of boat lift cable attachment, which enables the proximal end of the boat lift cable to be factory wound, the terminal end of the cable to be attached in the field, and the length of the cable to be adjusted quickly and conveniently, without having to totally restring the cable.

SUMMARY OF INVENTION

It is therefore an object of the present invention to provide a boat lift cable lock apparatus for releasably securing an elongate cable to a beam or other structural component of a boat lift.

It is a further object of this invention to provide a cable lock apparatus, which reliably and securely connects a boat lift cable to a structural component of the boat lift and which permits the structural component to satisfactorily support extremely heavy boats.

It is a further object of this invention to provide a boat lift cable lock apparatus, which effectively distributes the weight and stress of a supported load along a segment of a cable so that reliable, long term operation is exhibited and premature cable failure is significantly reduced.

It is a further object of this invention to provide a boat lift cable lock apparatus, which permits a boat lift cable to be selectively locked to or released from a structural component of the lift in a quick, easy and convenient fashion.

It is a further object of this invention to provide a cable lock mechanism that is particularly effective for use in boat lifts to secure a boat lift cable to a cable beam, cradle beam, or other structural component of the lift.

It is a further object of this invention to provide a boat lift cable lock apparatus, which permits the length of a boat lift cable to be adjusted quickly and conveniently without requiring restringing of the entire cable.

It is a further object of this invention to provide a cable lock apparatus that permits the tension along a plurality of boat lift cables to be quickly and effectively adjusted and equalized.

It is a further object of this invention to provide a cable lock apparatus, which is designed and constructed to prevent displacement, separation and loss of its component parts and pieces.

It is a further object of this invention to provide a cable lock apparatus that permits boat lift cables to be replaced quickly and conveniently.

It is a further object of this invention to provide a cable lock that enables boat lift cables to be factory wound.

It is a further object of this invention to provide a boat lift cable lock that permits the terminal of the cable to be fastened to a structural component quickly and conveniently in the field.

It is a further object of this invention to provide a cable lock that permits a boat lift cable to be strung and installed quickly and conveniently in a forward direction from the winder to a beam or other structural component.

This invention results from a realization that a releasable locking apparatus may be used to effectively secure a boat lift cable to a cradle beam, cable beam or other structural support component. This invention results from the further realization that a cable lock apparatus employing a frictional, wedge-like locking operation will permit the cable to be installed, locked, adjusted, removed and replaced in a quick, easy and convenient manner.

This invention features a boat lift cable lock apparatus for releasably fastening a cable to a structural component of the lift. This component may include a boat lift frame or a means for supporting a cable winder or other cable driving mechanism. The apparatus includes a bracket fixedly secured to the structural component and having a channel, which has a relatively wide portion and a relatively narrow portion. A locking element is slidably mounted within the channel. The cable extends through the channel between the locking element and the bracket. The locking element may be urged selectively toward the narrow portion of the channel to frictionally lock the cable between the locking element and the bracket. The locking element is urged toward the wide portion of the channel to unlock the cable and permit the cable to slide longitudinally through the channel between the locking element and the bracket.

In a preferred embodiment, at least one of the channel and the locking element includes a tapered shape. The channel and the locking element may be correspondingly tapered. The channel may face and abut the structural component. Preferably the bracket is fixedly secured to either a cradle beam or a cable beam.

The bracket may include an elongate slot that is communicably connected to the channel and the locking element may carry means defining a retainer boss that extends through the slot and beyond the bracket. The retainer boss may be engaged outside the bracket and driven longitudinally through the slot to urge the locking member toward the relatively wide portion of the channel. The narrow portion of the channel may include an open end through which the cable enters the channel. The cable may be wrapped about the locking element and the open end may accommodate two segments of the cable. The locking element may include a peripheral groove that receives the cable.

This invention also features an improved boat lift that employs the locking apparatus of this invention. The boat lift includes a boat supporting platform, a cable driving mechanism, a driven cable operably interconnecting the platform and the driving mechanism, and means for supporting the cable driving mechanism above the platform. A locking apparatus releasably fastens the cable to one of the platform and the means for supporting. The locking apparatus includes a bracket that is fixedly secured to one of the platform and the means for supporting. The bracket includes a tapered channel, which has a relatively wide end and a relatively narrow end. A correspondingly tapered wedge element is slidably mounted within the channel. The cable extends through the channel between the wedge element and the bracket. The wedge element is urged selectively toward the narrow end of the channel to frictionally lock the cable between the wedge element and the bracket, and toward the wide end of the channel to unlock the cable and permit the cable to slide longitudinally through the channel between the wedge element and the bracket.

BRIEF DESCRIPTION OF THE DRAWINGS

Other objects, features and advantages will occur from the following description of preferred embodiments and the accompanying drawings, in which.

DETAILED DESCRIPTION OF PREFERRED EMBODIMENTS

Figure 1:
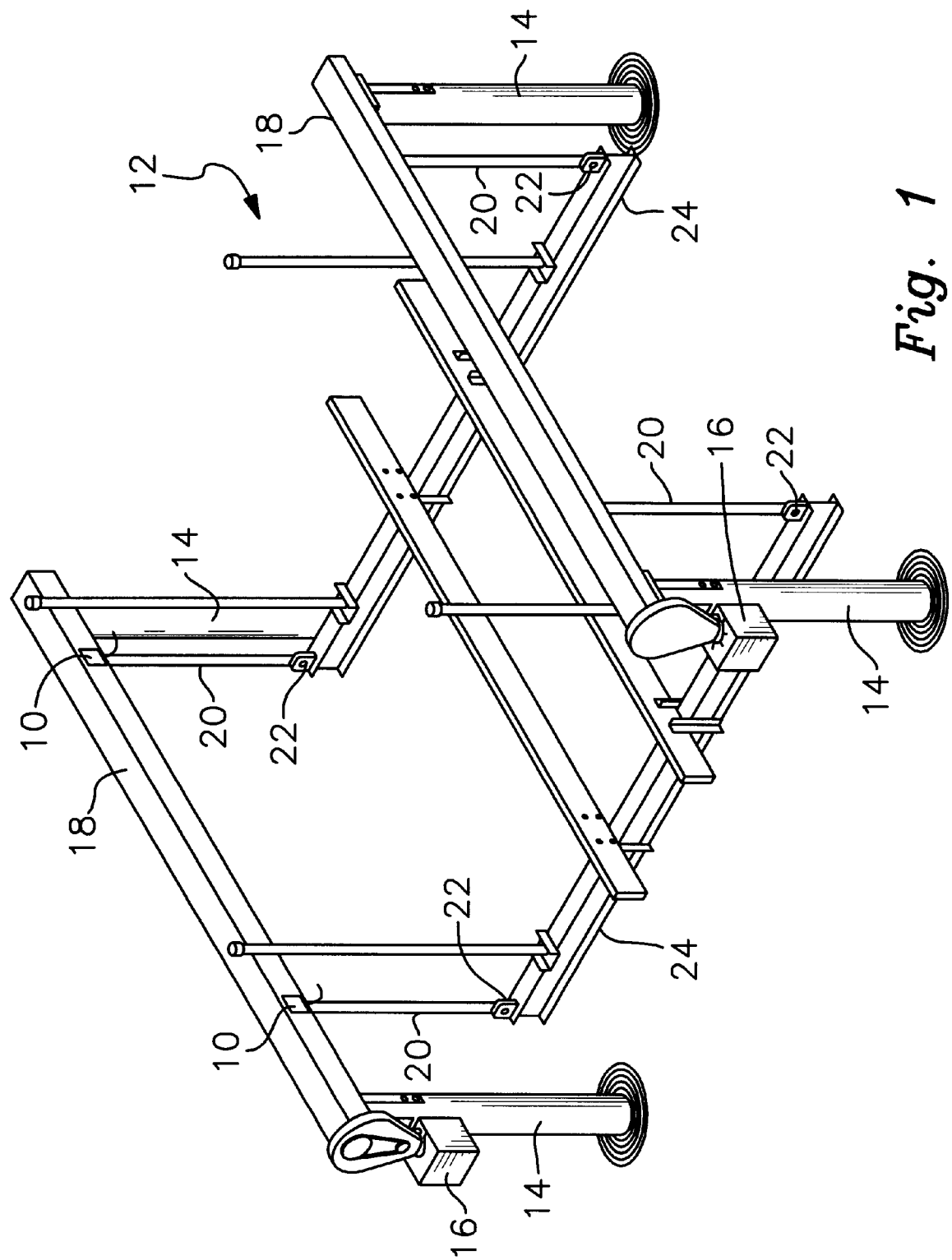
FIG. 1 is a perspective view of a two stage boat lift, which employs the cable lock apparatus of this invention for releasably securing each cable to a cable beam.

There is shown in FIG. 1 a pair of cable lock apparatuses 10, which are employed in a two-stage boat lift mechanism 12. The boat lift mechanism may comprise any of a variety of boat lifts. The particular details of the lift, except as they apply and relate to apparatus 10, should be understood to persons skilled in the art and do not comprise a part of this particular invention.

Boat lift 12 includes a plurality of support pilings or posts 14, which support a pair of drive motors 16 and associated C-channel cable beams 18. A standard boat lift cable winch or winder, not shown, extends through each of the cable beams 18 and is driven by a respective motor 16 in a known manner. A pair of cables 20 are suspended from each winder. Each cable 20 is operably engaged with a respective pulley 22, which is in turn secured to the upper surface of a cradle beam 24, proximate one end of that beam. From its associated pulley 22, each cable 20 extends upwardly and is releasably secured proximate its distal end to a respective cable beam 18 by a corresponding cable lock apparatus 10. It should be noted that, in FIG. 1, only the cable lock apparatuses 10 on the left-hand cable beam 18 are illustrated. The cable lock apparatuses on the right-hand cable beam are obscured by that beam.

Figure 2:
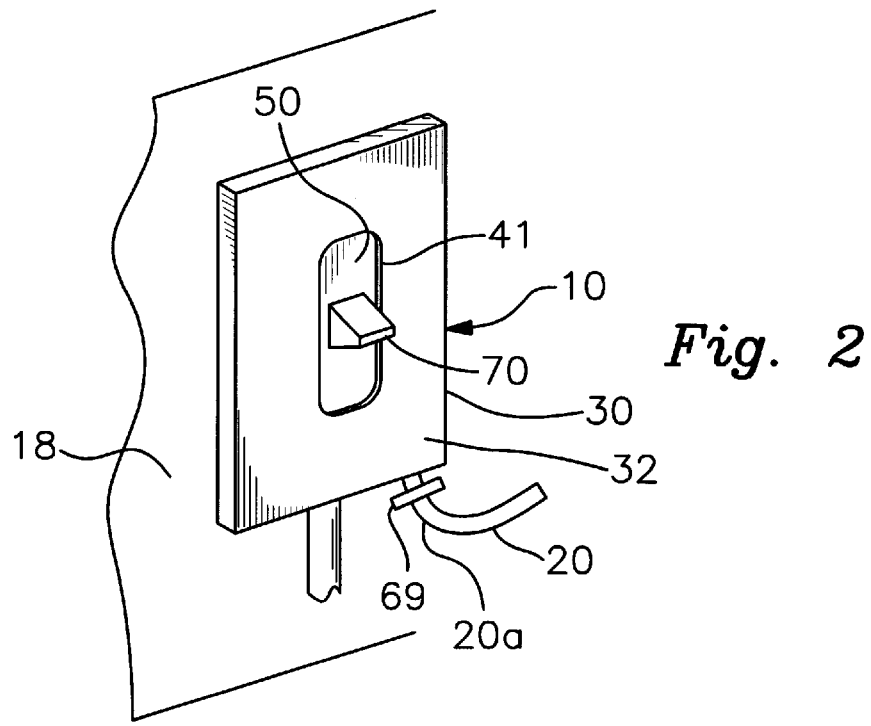
FIG. 2 is a perspective exterior view of the cable lock mechanism and a portion of a cable secured thereto.
Figure 3:
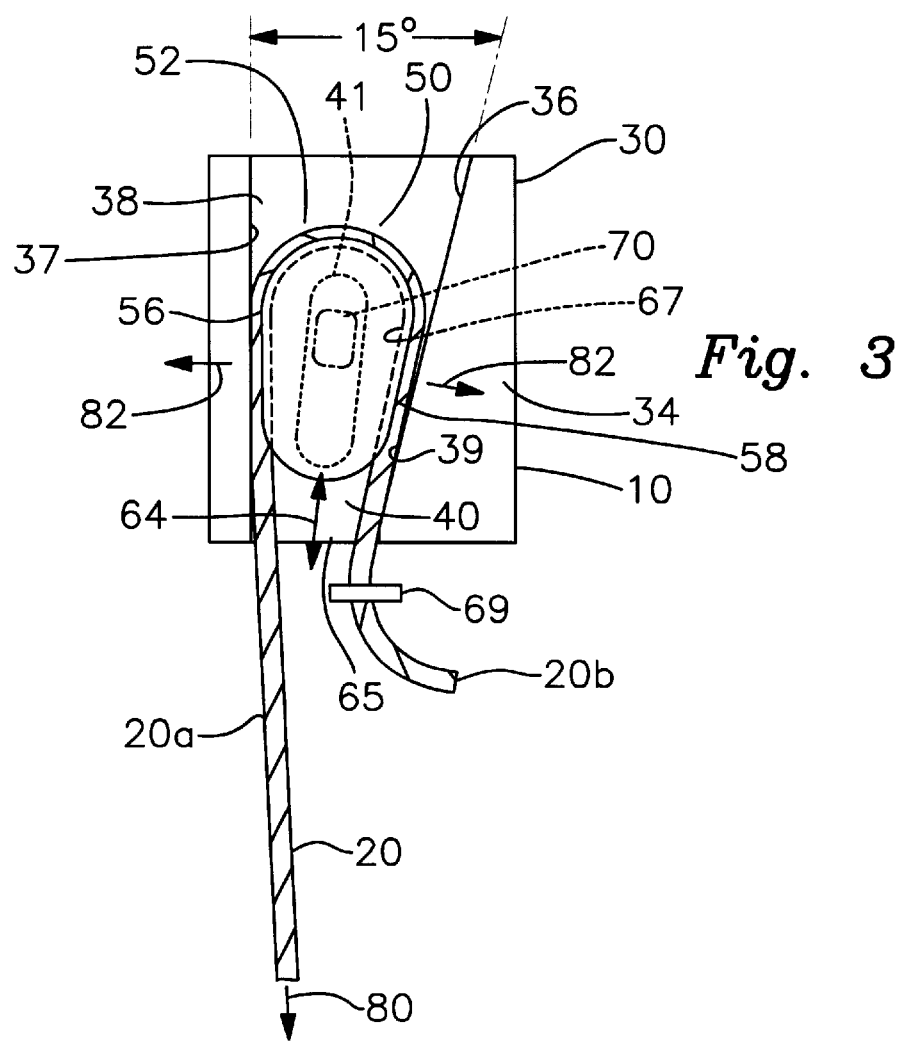
FIG. 3 is an interior elevational view of the cable lock mechanism with its interengaged cable.
Figure 4:
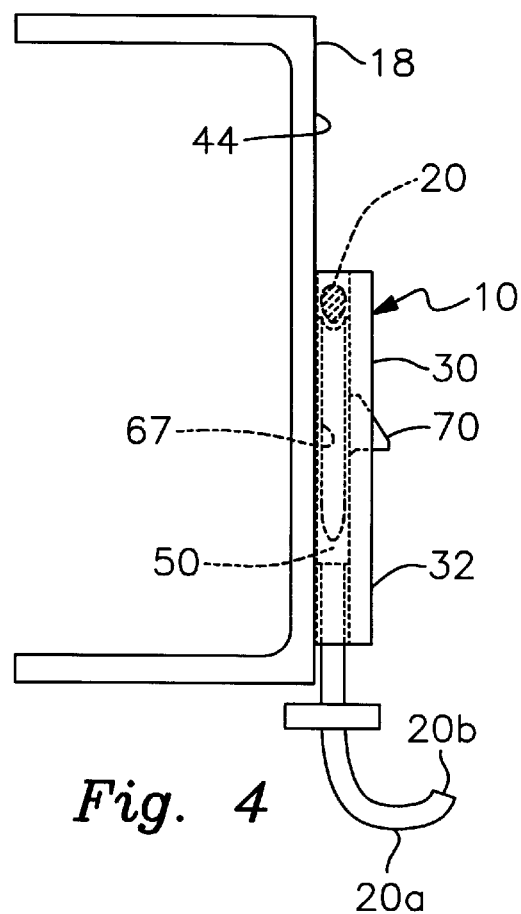
FIG. 4 is an elevational, side view of the cable lock apparatus; the apparatus is secured to a cable beam and an associated cable is interengaged with the apparatus.
Figure 6:
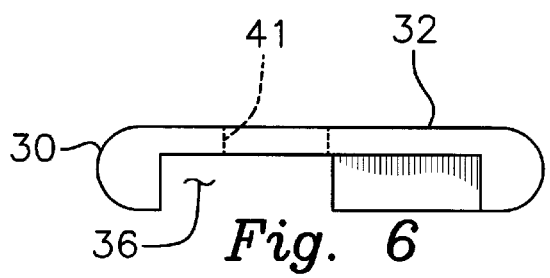
FIG. 6 is a top plan view of the bracket.
Figure 5:
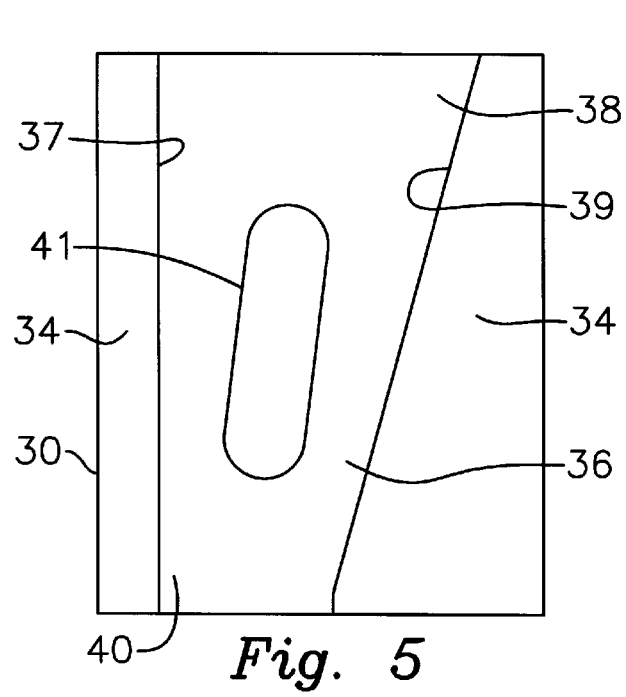
FIG. 5 is an elevational, interior view of the bracket, with a channel and elongate slot specifically shown.
Figure 7:
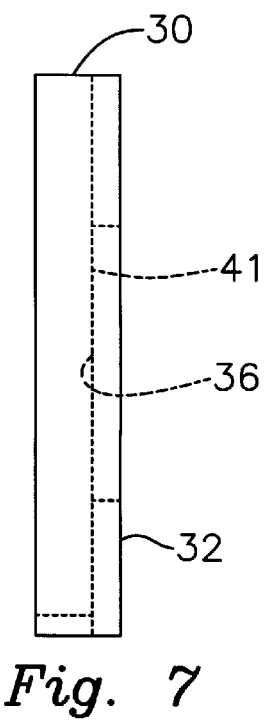
FIG. 7 is an elevational side view of the bracket.
Figure 8:
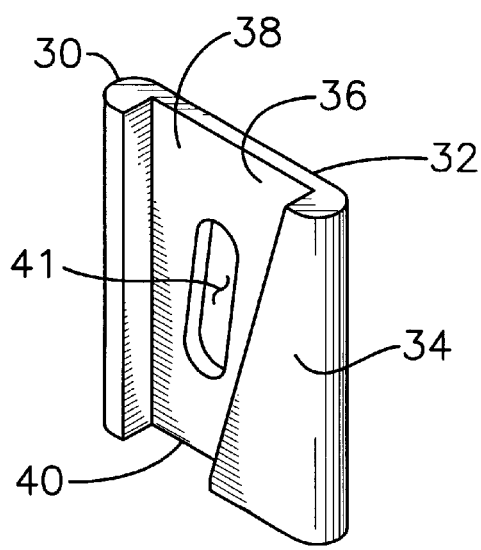
FIG. 8 is a inside perspective view of the bracket.

A representative cable lock apparatus 10 is illustrated in FIGS. 2–4. Each such lock includes a generally rectangular, plate-like mounting bracket 30, which is shown alone in FIGS. 5–8. Bracket 30 includes a generally flat outer surface 32 and a generally flat inner surface 34. A tapered channel 36 is formed in the inside face of bracket 30. The channel exhibits a narrowing taper as it extends from the top end to the bottom end of the bracket. As a result, channel 30 includes a relatively wide upper end portion 38 and a relatively narrow lower end portion 40. As best shown in FIG. 5, tapered channel 36 particularly includes a substantially vertical edge 37 and an angled edge 39 that defines an angle of approximately 15 degrees with edge 37. Alternative tapers may be employed within the scope of this invention. An elongate slot 41, FIGS. 2, 3 and 5–8, is formed through exterior face 32 of bracket 30 and in communication with channel 36. The slot has somewhat rounded upper and lower ends. The function of slot 41 is described more fully below.

Typically, bracket 30 is composed of a rugged and durable metal or metal alloy of the type employed in the boat lift art. This component should be capable of withstanding the corrosive conditions frequently exhibited in boat lift environments. As best shown in FIGS. 2–4, bracket 30 is welded or otherwise permanently secured to an inside surface 44 of C-channel cable beam 18. Inside face 34 engages cable beam surface 44 such that channel 36 faces and abuts cable beam 18. Preferably, bracket 30 is positioned proximate the lower edge of surface 44, in the manner best shown in FIG. 4.

As shown in FIGS. 2–4, a locking wedge element 50 is slidably mounted within tapered channel 36 of bracket 30. Wedge element 50, shown alone in FIGS. 9 and 10, is again preferably composed of durable metal or metal alloy, which is capable of withstanding the harsh and corrosive conditions that often accompany boat lift applications. The wedge element includes rounded upper and lower ends 52 and 54, respectively, and a pair of tapered sides 56 and 58 that interconnect the ends. Sides 56 and 58 typically include a taper, which corresponds to the taper of bracket channel 36. In the disclosed embodiment, that taper is 15 degrees, although other angles may be utilized. In alternative embodiments, the bracket and wedge element may employ tapers that do not correspond perfectly. It should also be understood that the term "wedge element" is intended to cover any component that exhibits a taper and that interengages the bracket in a wedge-like manner. This component is not limited to a perfect wedge or pie-shaped configuration. As shown in FIGS. 4 and 10, wedge element 50 includes a generally flat outer surface 60 and a generally flat inner surface 62. The thickness of the wedge element is slightly less than the depth of bracket channel 36. As a result, wedge element 50 is slidable generally up and down within channel 36, as indicated by double-headed arrow 64 in FIG. 3. The wedge element has a maximum width that is greater than the open lower end 65 of channel 36. This prevents the wedge element from sliding out of the channel through lower open end 65.

A cable accommodating grove 67 extends peripherally about wedge element 50 in the manner best shown in FIGS. 3, 4, 9 and 10. Specifically, groove 67 extends along tapered sides 56 and 58, and rounded upper end 50. The groove has a width that is sufficient to accommodate cable 20, in a manner that is described more fully below.

Figure 9:
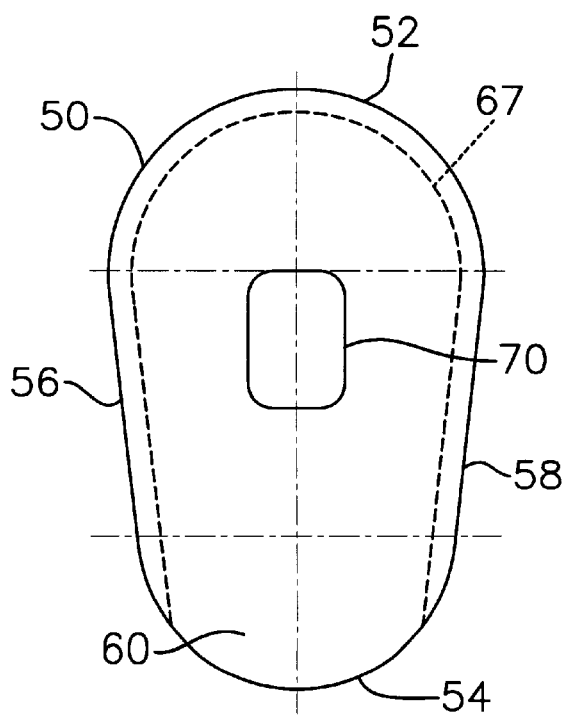
FIG. 9 is an elevational front view of the wedge or locking element.
Figure 10:
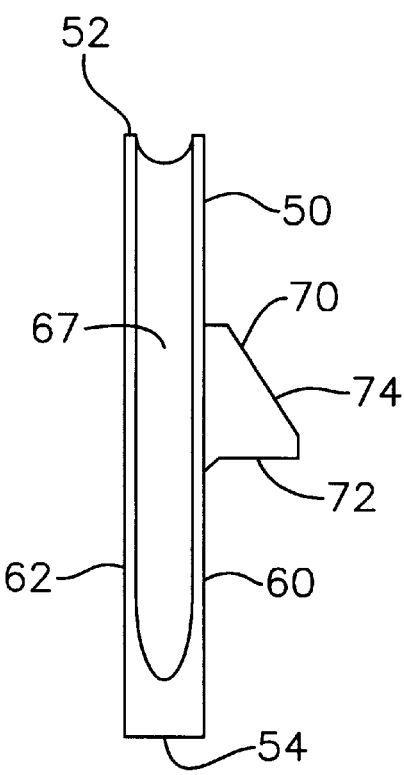
FIG. 10 is an elevational side view of the wedge element.

A retainer boss 70, FIGS. 2, 9 and 10, is unitarily connected to and extends outwardly from surface 60 of wedge 50. Boss 70 includes a generally perpendicular, lower surface 72 and a slanted upper surface 74. In certain versions it can be connected non-unitarily to the wedge element. As shown in FIGS. 2–4, when wedge element 50 is received in bracket channel 36, boss 70 extends outwardly through slot 41 and beyond exterior surface 32 of bracket 30. If wedge element 50 is slid upwardly within channel 36, eventually, boss 70 engages the upper end of slot 41 and further upward movement by the wedge element is restricted. As a result, wedge element 50 is effectively captured within slot 36 and cannot be removed from the bracket. This is a significant advantage of the invention. Fully enclosing element 50 within bracket 30 prevents the wedge element from becoming separated from the bracket and inadvertently misplaced or lost. It also enables the lock to operate effectively and reliably. It should be noted that, in alternative versions, channel 36 may be disposed between inner and outer surfaces 32, 34 of bracket 30 rather than being formed in inner surface 34. Regardless, when surface 34 is engaged with beam 18 the channel is enclosed such that wedge element 50 is captured by bracket 30.

Cable 20 is interengaged with lock apparatus 10 in the manner best shown in FIGS. 2, 3 and 4. Therein, a distal end portion 20a of cable 20 is depicted. This is the end portion of the cable that is opposite the proximal end attached to the boat lift winch. In the embodiment of FIGS. 2–4, distal or terminal end portion 20a is secured by means of locking apparatus 10 to cable beam 18. Distal cable portion 20a extends through bracket channel 36 in the manner best shown in FIG. 3. Specifically, the cable enters the channel through lower open end 65 and extends between tapered side 56 of wedge element 50 and the vertical edge 37 of bracket 30. The cable then wraps about rounded end 52 of wedge element 50 and reverses direction, extending between side 58 of wedge element 50 and tapered bracket edge 39. The cable then extends outwardly through open lower end 65 of channel 36 to a free end 20b. The segment of cable 20 that is wrapped about element 50 is accommodated by peripheral groove 67. A clamp 69 is carried by cable 20 proximate its free end to prevent the cable from slipping between the wedge element and bracket and thereby disengaging the lock apparatus.

Cable portion 20a is initially inserted into bracket 30 by engaging boss 70 and urging wedge element 50 toward the wide portion 38 of channel 36. Free end 20b of cable portion 20a is strung through the lift pulley 22, FIG. 1, in a forward direction from the winder. The cable is then inserted into open end 65 of bracket channel 36, wrapped about wedge element 50 and engaged with peripheral groove 67. Free end 20b is finally drawn out of bracket 30 through open end 65 and the length of the cable is adjusted as required.

After cable 20 is engaged with lock 10 in the above-described manner, it may be quickly and conveniently locked in place. As shown in FIG. 3, this is accomplished by applying a pulling force or tension to cable 20 in the direction of arrow 80. Cable portion 20a urges wedge element 50 to slide downwardly, in a direction generally parallel to the direction of the tensile force, toward narrow channel portion 64. The wedge element is thereby pushed into the increasingly constricted portion of the bracket channel. This causes the wedge element to become wedged in the channel and to frictionally lock cable portion 20 between the wedge element and the bracket edges 37 and 39. A wedge force, represented by arrows 82 in FIG. 3, is applied by wedge element 50 to that portion of cable 20 within channel 36 and, more specifically, between wedge sides 56 and 58 and bracket edges 37 and 39, respectively. The cable is prevented from moving longitudinally relative to the bracket and is effectively locked in place.

After each of the cable lock apparatuses 10 and associated cables 20 have been set in the above-described manner, the boat lift may be operated in a known fashion to raise and lower a vessel. Each lock apparatus 10 helps to distribute the load of the vessel and frame along a section of its respective cable 20. Specifically, the load is distributed to that segment of cable 20 that surrounds the periphery of wedge element 50. The load is no longer supported at a single contact or attachment point.

Figure 11:
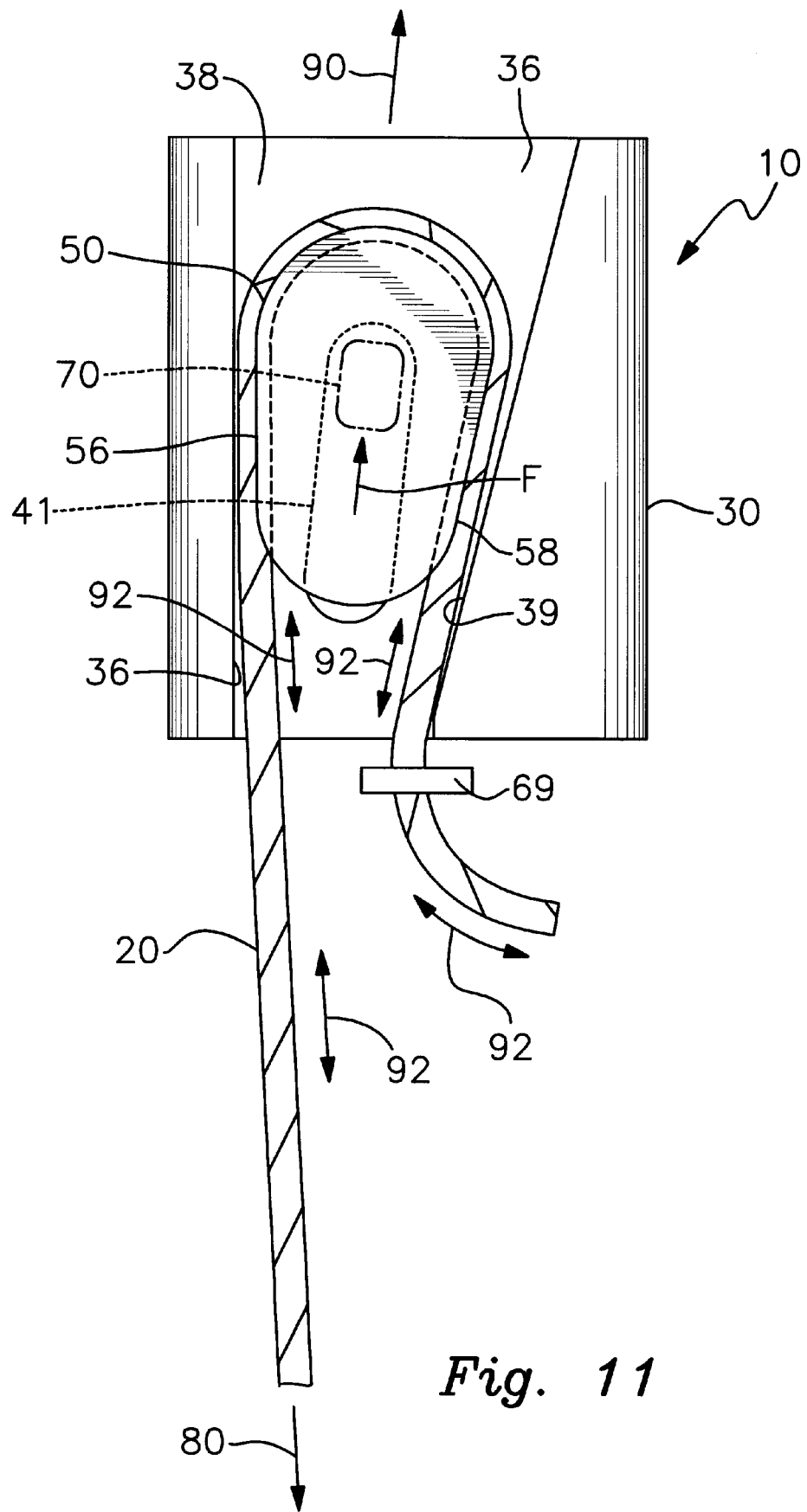
FIG. 11 is an elevational interior view of the cable lock apparatus in its released condition, which permits the cable to slide longitudinally between the wedge element and the bracket.

Lock apparatus 10 may be quickly and conveniently operated to release cable 20 so that the length of the cable may be adjusted or so that the cable may be removed and replaced. This is accomplished in the manner shown in FIG. 11. Force F is applied to retainer boss 70 by a hammer or other means. This force should be sufficient to dislodge wedge element 50 from the wedged, locking condition shown in FIG. 3. The release member is impacted or otherwise struck so that wedge element 50 is urged toward relatively wide upper portion 38 of channel 36. As previously described, release member 70 engages the upper end of bracket slot 41 so that the wedge element remains captured within bracket 30. As the wedge element is urged upwardly in the direction of arrow 90, the previously described wedging force is released and cable 20 is unlocked. Specifically, side 56 of wedge element 50 is separated sufficiently from bracket edge 36 and side 58 of wedge element 50 is separated sufficiently from bracket edge 39 such that cable 20 is able to slide longitudinally through channel 36 between wedge element 50 and bracket 30, in the manner indicated by double-headed arrows 92. The length of cable 20 thus may be adjusted by any desired degree. This adjustment may be performed to equalize the tension on the respective cables or to adjust the height or angle of the boat lift platform. When the required adjustment has been completed, the cable is again quickly and conveniently re-locked in place by pulling the cable in the direction of arrow 80. This pulls wedge element 50 downwardly into the wedged and locking condition shown in FIG. 3.

By utilizing the above described cable lock 10 for each cable, cable installation is facilitated considerably. The cable may be strung in the field in a forward direction from the winder to the terminal point of attachment. This facilitates and expedites the installer's task considerably and renders cable adjustment much more convenient. The cable can be prewound at the factory, thereby eliminating the time, difficulty and expense associated with winding the cable in the field.

Figure 12:
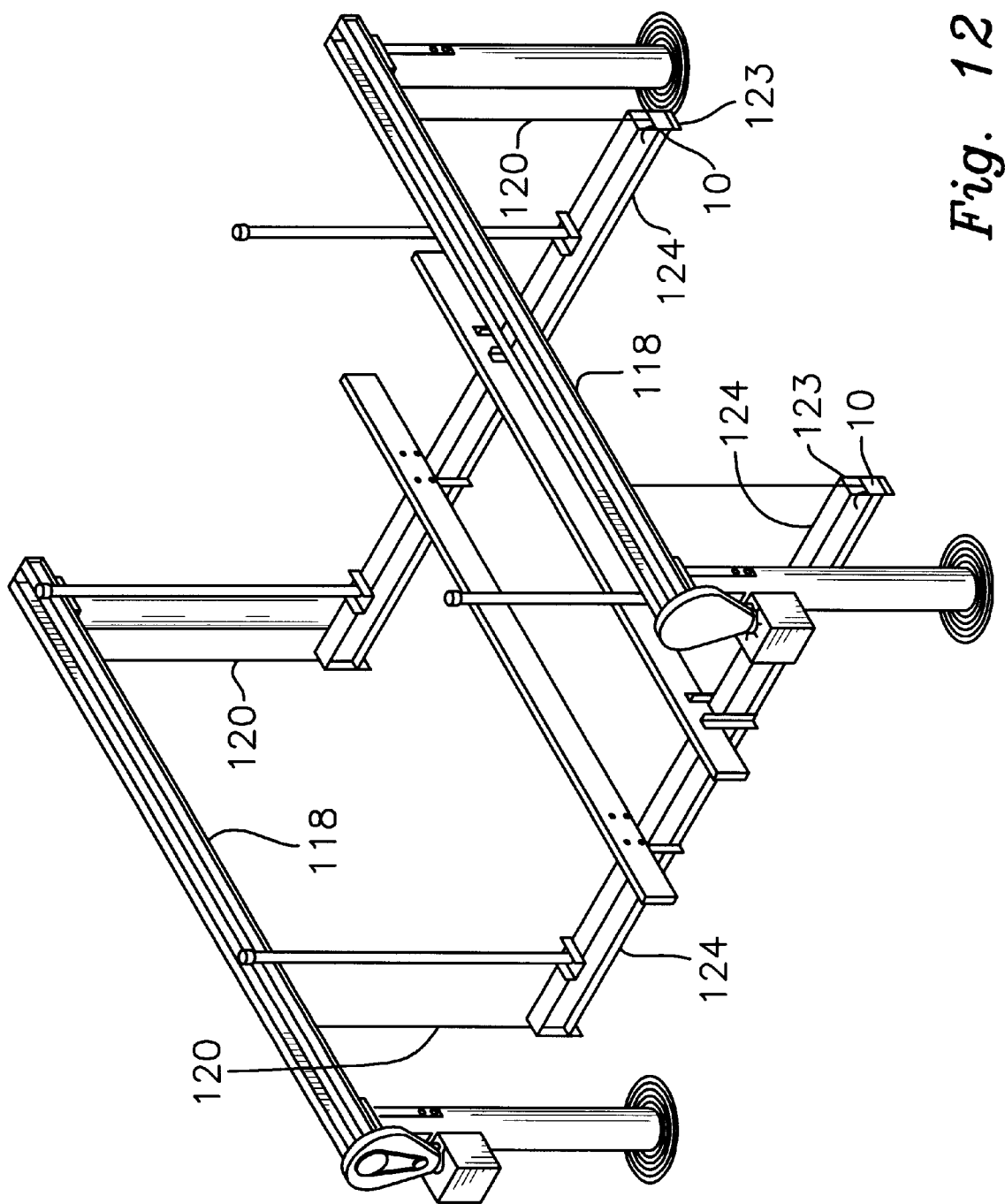
FIG. 12 is a perspective view of one-stage boat lift, which employs a plurality of cable lock mechanisms to secure the distal or terminal end of each cable to a respective cradle beam.

FIG. 12 depicts a single-stage boat lift 112 wherein four cables 120 are used to raise and lower a pair of I-beam type cradle beams 124. Each cable is operably connected at its upper end to a conventional winder that is supported within one of a pair of cable beams 118. The lower end of each cable is secured to one end of a respective cradle beam 124 by one of the locking apparatuses 10 of this invention. Only the locking apparatuses 10 employed at the right-hand ends of cradle beams 24 are shown. Similar locking apparatuses, which are obscured, are utilized for attaching cables to the left-hand ends of the cradle beams.

Figure 13:
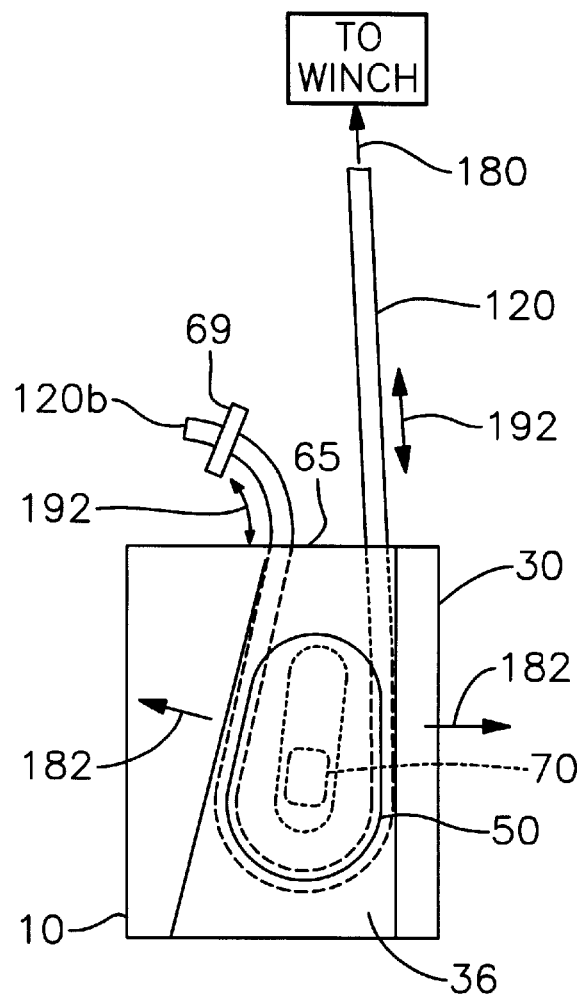
FIG. 13 is an inside elevational view of the cable lock mechanism employed in the one-stage boat lift of FIG. 12.
Figure 14:
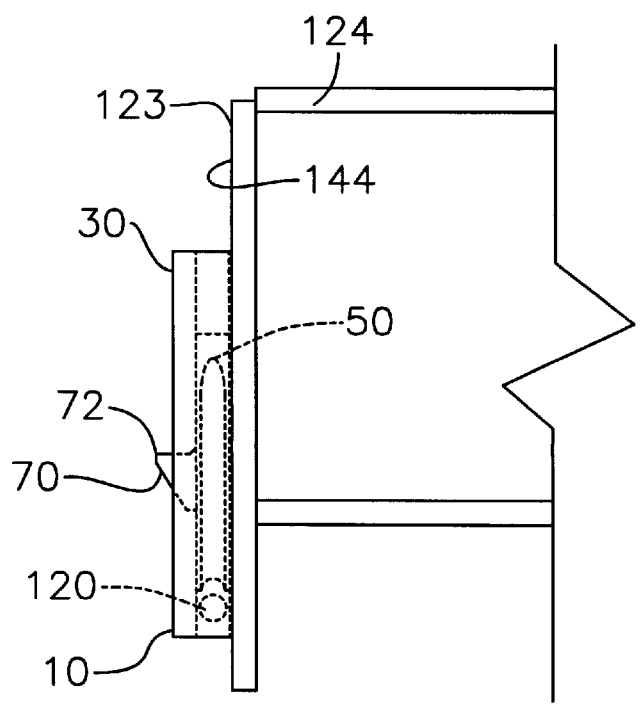
FIG. 14 is an elevational side view of the cable lock mechanism shown in FIGS. 12 and 13.

As shown in FIGS. 13 and 14, the locking apparatus 10 used in the single-stage boat lift is structurally identical to the locking apparatus previously described. However, in the single-stage version the locking apparatus is secured to and end plate 123, FIG. 14, which is, in turn, welded or otherwise fixed to a respective end of a cradle beam 124. Apparatus 10 is inverted on plate 123 so that the pulling force on the cable is exerted in an upward direction, rather than in the downward direction of the previously described embodiment. Specifically, apparatus 10 employs the plate-like bracket 30 having a tapered channel 36. Bracket 30 is welded or otherwise permanently secured to outer face 144 of plate 123 in the manner best shown in FIG. 14. Channel 36 is oriented such that the relatively wide portion of the channel is located at the lower end of the bracket and the relatively narrow portion of the channel is located at the upper end of the bracket.

Wedge element 50 has a tapered shape that corresponds to the taper of channel 36. The wedge element is slidably mounted in channel 36 and includes a retainer boss 70 that extends outwardly from the wedge element and through a corresponding slot in bracket 30. Again, the wedge element is inverted from the orientation shown in the previously described embodiment so that it slides within the channel and operates in a wedge-like fashion to perform frictional locking in a manner analogous to that previously described. The wedge element is again captured within the bracket.

As best shown in FIG. 13, cable 120 extends downwardly from the winch and into channel 36 through open end 65. The cable is wrapped about and received by the peripheral groove in wedge element 50. Cable 120 extends between the wedge element and the edges of the bracket that define channel 36. The free end 120b of cable 120 is positioned outside of the bracket. To lock cable 120 in place, a pulling force or tension is applied to the cable in the direction of arrow 180. This urges wedge element 50 generally upwardly within the channel and causes it to exert a wedging force 182 on cable 120. As a result, the cable is frictionally locked between wedge element 50 and the edges of bracket 30 that define channel 36. The load that is exerted by the cradle beam 124 and supported boat is distributed along the segment of cable 20 that engages wedge element 50.

The lock is released to adjust the length of the cable or to change the cable. This is accomplished by striking surface 72 of retainer boss 70 and urging wedge element 50 downwardly into the relatively wide portion of channel 36. As previously described, the wedge or frictional force that element 50 exerts on cable 120 is broken and the cable is released and allowed to slide longitudinally through the channel, as indicated by doubleheaded arrows 192. The cable may then be changed or adjusted as required. Inconvenient disassembly at the upper winder end of the cable is eliminated.

In the versions disclosed herein winders are employed to raise and lower the cables in a standard fashion. It should be understood that, in alternative embodiments, various other mechanisms may be used to drive the cables longitudinally and vertically in order to raise and lower the platform. The cable lock operates equally effectively in such embodiments. In single and three stage versions the lock is carried by the platform, in the manner described in FIG. 12. In two stage versions, wherein an alternative cable driving mechanism is employed, the lock is mounted to a housing, beam, enclosure or some other structure, which accommodates and supports the cable driving mechanism. The lock thereby operates analogously to the embodiment shown in FIG. 1.

It should be noted that in alternative embodiments, the bracket and wedge elements may be comprised of molded plastics. Additionally, the locking apparatus may be used for securing a cable to various structural components outside of the boat lift industry. As used herein, "cable" should be construed broadly to include all forms of ropes, cords, lines and elements regardless of their composition or the particular application for which they are used.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. In a boat lift, the improvement comprising:
   means for driving a cable in a longitudinally vertical manner;

means defining a boat supporting platform;

means for supporting said means for driving above said platform;

a cable operably interconnecting said means for driving and said platform; and a locking apparatus for releasably and longitudinally adjustably fastening said cable to one of said platform and said means for supporting; said locking apparatus including a bracket rigidly secured to one of said platform and said means for supporting and including a tapered channel, which has a wide portion and a narrow portion, and a correspondingly tapered wedge element that is slidably mounted within said channel; said cable extending through said channel between said wedge element and said bracket; said wedge element being urged selectively toward said narrow portion of said channel to frictionally lock said cable between said wedge element and said bracket and toward said wide portion of said channel to unlock said cable and permit said cable to slide longitudinally through said channel between said wedge element and said bracket whereby the length of said cable may be adjusted.

2. The apparatus of claim 1 in which said channel is formed along an inside surface of said bracket and wherein said channel faces and flushly abuts one of said platform and said means for supporting such that said cable is confined within said channel.

3. The apparatus of claim 1 in which said bracket includes an elongate slot that is communicably connected to said channel and said locking apparatus carries a retainer boss that extends through said slot and beyond said bracket, said retainer boss being selectively engaged outside said bracket and driven longitudinally through said slot to urge said locking apparatus toward said wide portion of said channel.

4. The apparatus of claim 1 in which said narrow portion of said channel includes an open end through which said cable enters said channel.

5. The apparatus of claim 4 in which said cable is wrapped about said wedge element and said open end accommodates up to two segments of said cable.

6. The apparatus of claim 5 in which said locking element includes a peripheral groove that receives said cable.

7. The apparatus of claim 6 in which said wedge element is urged toward said narrow portion of said channel in response to a tensile force being exerted on said cable.

8. In a boat lift, the improvement comprising:

means for driving a cable in a longitudinally vertical manner;

a boat supporting platform;

a support structure that holds said means for driving above said platform; and means for releasably and longitudinally adjustably fastening said cable to one of said platform and said support structure, said means for fastening including a bracket rigidly secured to one of said platform and said support structure and including a channel, which has a wide portion and a narrow portion, and a locking element that is slidably mounted within said channel, said locking element being urged selectively toward said narrow portion of said channel to frictionally lock said cable between said locking element and said bracket and toward said wide end of said channel to unlock said cable and permit said cable to slide longitudinally through said channel between said locking element and said bracket, whereby the length of said cable may be adjusted.

9. The apparatus of claim 8 in which at least of one said channel and said locking element includes a tapered shape.

10. The apparatus of claim 8 in which said channel and said locking element are correspondingly tapered.

11. The apparatus of claim 8 in which said channel is formed in an inside surface of said bracket and which said bracket faces and flushly abuts one of said platform and said support structure such that said cable is held within said channel.

12. The apparatus of claim 8 in which said rigidly secured bracket includes an elongate slot that communicates with and is fixed relative to said channel and in which said locking element carries a retainer boss that extends outwardly through said slot and beyond said bracket, said retainer boss being selectively engaged outside said bracket and driven longitudinally through said slot to urge said locking member toward said wide portion of said channel.

13. The apparatus of claim 12 in which said retainer boss is unitarily connected to said locking member.

14. The apparatus of claim 8 in which said narrow portion of said channel includes an open end through which said cable enters said channel.

15. The apparatus of claim 8 in which said cable is wrapped about said locking element and said open end accommodates two segments of said cable.

16. The apparatus of claim 8 in which said locking element includes a peripheral groove that receives said cable.

17. The apparatus of claim 8 in which said platform includes a cradle beam and said bracket is rigidly and immovably secured to said cradle beam.

18. The apparatus of claim 8 in which said support structure includes a cable beam and said bracket is rigidly and immovably secured to said cable beam.

19. In a boat lift, the improvement comprising:

means for driving a cable in a longitudinally vertical manner;

a boat supporting platform;

a support structure that holds said means for driving above said platform; and means for releasably and longitudinally adjustably fastening said cable to one of said platform and said support structure, said means for fastening including a bracket rigidly secured to one of said platform and said support structure, said bracket including a channel for receiving said cable, and means disposed within said channel for frictionally gripping said cable when tension is applied to said cable and for selectively releasing said cable to permit the length of said cable to be adjusted.

* * * * *